April 25, 1939. W. F. HELMOND 2,155,989
TYPEWRITING MACHINE
Original Filed Dec. 2, 1933 2 Sheets-Sheet 1
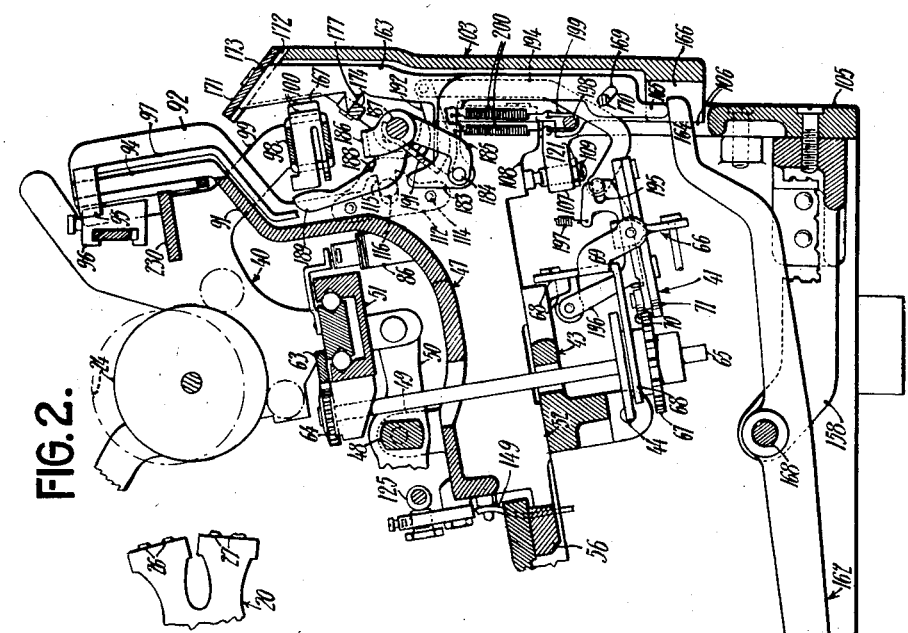
Inventor:
William F Helmond
by B C Stickney
Attorney.

April 25, 1939. W. F. HELMOND 2,155,989
TYPEWRITING MACHINE
Original Filed Dec. 2, 1933 2 Sheets-Sheet 2
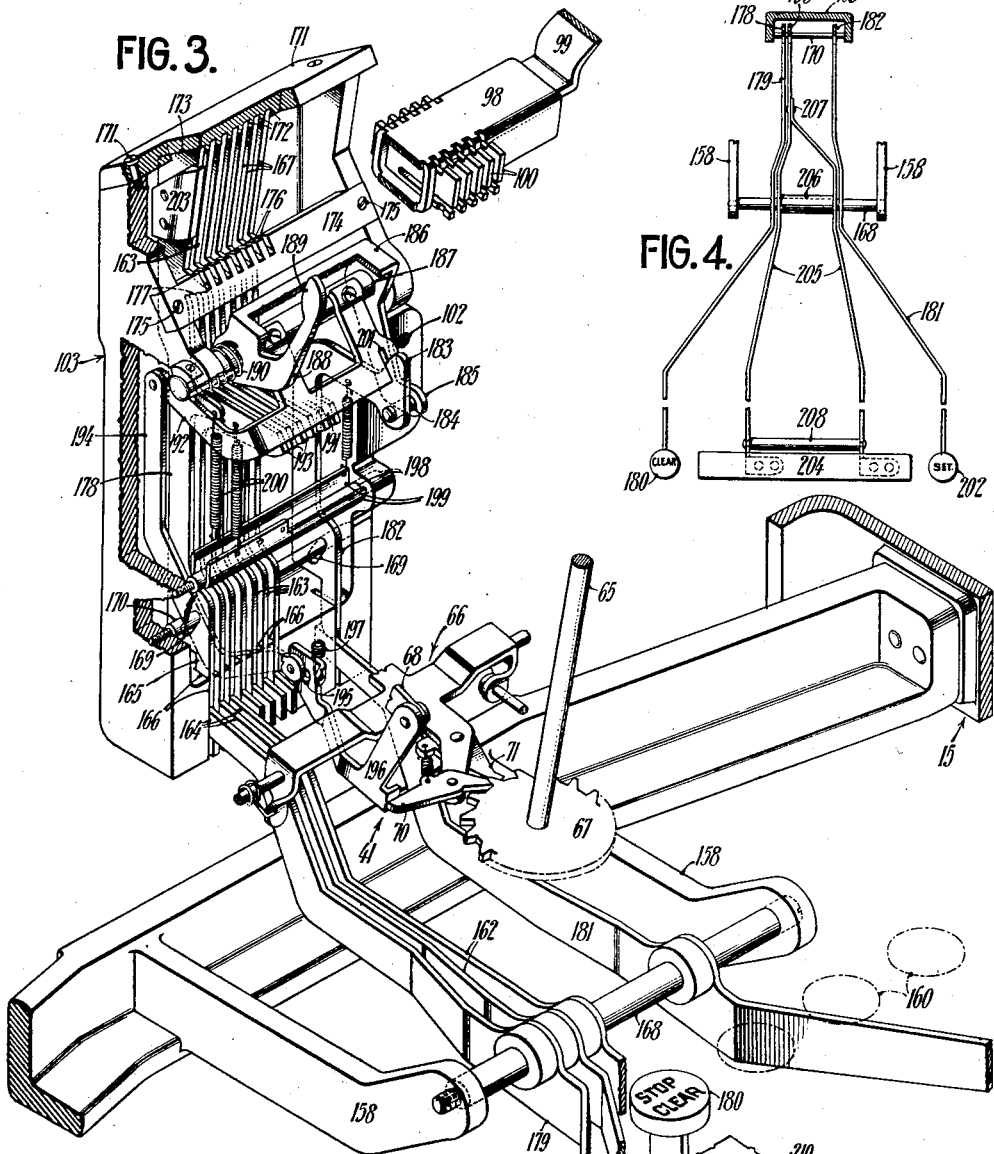
Inventor:
William F. Helmond
by B. C. Stickney
Attorney.

Patented Apr. 25, 1939

2,155,989

UNITED STATES PATENT OFFICE 2,155,989

TYPEWRITING MACHINE

William F. Helmond, West Hartford, Conn., assignor to Underwood Elliott Fisher Company, New York, N. Y., a corporation of Delaware Original application December 2, 1933, Serial No. 700,646. Divided and this application February 17, 1937, Serial No. 126,109

6 Claims. (Cl. 197—178)

This invention relates to tabulating mechanism. There is shown a series of key-settable tabulating stops mounted in a rack carried by the carriage. A series of key-operated denominational stops, co-operative with the key-set stops on the carriage, are housed in a compact column-like frame, to form a readily attachable unit supported by, and at the rear of, the typewriter framework, said stop-housing frame preferably extending vertically, in consonance with the desired erect lines of the machine contour. The denominational stops are in the form of vertical blades whose lower ends are detachably connected to denominational key-levers operable to lift said blades. Heretofore, in order that such blades could, by lifting thereof, be made to co-operate with the carriage-carried stops, the latter were disposed above the tops of the blades.

The present improvements include novel blade-guiding means whereby the denominational-stop blades when they are lifted are at the same time moved forwardly for the purpose of projecting them toward the carriage-carried stops which are disposed forwardly of the upper front edges of the blades, and are therefore co-operable with the latter both in upper-case and lower-case positions of the carriage. The denomination-stop blades have the usual close letter-spacing.

The novel blade-guiding means include an abutment for upwardly-facing edges presented preferably by the extreme upper ends of the denominational-stop blades, said abutment and edges being arranged at such inclination that when a blade is lifted by the key-lever, the upper end portion of the blade is at the same time forced forwardly into the path of the set stops on the carriage. The blade-guiding surface of the abutment may be formed by the bottoms of spaced slots in said abutment, said slots effecting the aforesaid close spacing of the blades, and the sides of the slots supporting the blades against the lateral thrust which they receive when arresting the carriage. Thus said slotted abutment acts as a spacing means for the blades, and as a means to force the blades forwardly when they are lifted, and also as a means for supporting the blades against said lateral thrust. A guide, which may be also slotted, is spaced below said blade-end-guiding abutment, and keeps the blades articulated with the latter when they are retracted, said lower guide co-operating to force the blades rearwardly when they are retracted.

The aforesaid housing which mounts the denominational-stop blades also mounts a cross-shaft to which is fastened a universal bar operable, by the lifting of any one of the blades, for effecting release of the carriage from the escapement devices. Slidable along the cross-shaft, and also rockable thereabout, is a sleeve or yoke having an arm forming a stop-setting finger and another arm directly articulated to another blade which is mounted alongside the denomination-stop blades, so that it may be connected at its lower end to a stop-restoring key-lever in the same manner as the denominational blades are connected to key-levers. The yoke, rockable about said cross-shaft, the additional blade articulated therewith, and the corresponding key-lever form a stop-setting train. The stop-setting finger of the yoke is opposite the front of the fore-and-aft shiftable key-settable stops on the carriage, and the mounting of the yoke on the cross-shaft of the universal bar conduces to compactness of assembly.

Lengthwise of the universal-bar shaft, the stop-setting yoke is held in normal position by a spring, to the end that should the carriage be released while the stop-setting finger of the yoke is between adjacent stops on the carriage, the yoke and its finger will move along with the carriage to avoid jamming the finger and obstructing its spring-pressed retraction.

Similar to the aforesaid denominational blades is an additional blade liftable by a key-lever and acting as a stop-restorer, said stop-restorer blade being guided at its upper end by the same abutment and lower guide which guide the denominational blades. Thus the stop-restoring key-lever projects the stop-restoring blade forwardly at the same time that the latter is lifted, the forward projecting of the stop-restoring blade serving to restore a key-set stop on the carriage that has been tabulated to the denominational blade of lowest denomination. The stop-restoring blade may also have a cam operative when the blade is held in its operative position by its key to restore all the stops on the carriage by a run of the latter.

This application is a division of my application Serial No. 700,646, filed December 2, 1933, now Patent No. 2,074,333 issued March 23, 1937.

Other features and advantages will hereinafter appear.

In the accompanying drawings,

Figure 1 is a sectional plan view of the rear portion of the tabulating mechanism.

Figure 2 is a cross-sectional side elevation of a noiseless typewriter incorporating the novel tabulating mechanism, the section being taken at about the middle of the machine.

Figure 3 is a perspective view of the improved tabulating-stop mechanism.

Figure 4 is a top plan view, indicating how the tabulating mechanism seen in Figure 3 is modified to act as a one-key column-tabulator, Figure 4 also showing the relative arrangement of a stop-setting key-lever, a stop clearing or restoring key-lever, and a novel column-tabulating key-bar.

Figure 5 is a top plan view of some of the key-settable stops on the carriage and the relation to the latter of the stop-setting finger, the counter-stop blade, and the stop-restoring blade.

The invention is shown as applied to an Underwood noiseless typewriter. A carriage 40 supporting a platen 24 is driven in letter-feed direction by a spring motor 36. The carriage is under control of the usual escapement 41 and is caused to letter-feed the carriage whenever one of the alphabet or numeral keys 21 in the key-board 22 is being operated.

In Figure 2 there is shown a cross-bar or platform 43 upon which rests a bolster 47, which supports the platen-carriage 40 by means of a rock-shaft 48, journaled in lugs 49 of said bolster. Arms 50 of said rock-shaft 48 enable the latter, when operated by a case-shift key-train, not shown herein but described in Patent No. 1,661,799, dated March 6, 1928, to Going, to raise and lower a track-bar 51 along which the platen-carriage 40 runs.

The bolster 47 extends from side to side of the machine-frame 15, and is guided for fore-and-aft adjustment of the platen for the usual purpose of bringing the platen forward or rearward, in accordance with the number of superposed work-sheets positioned around the platen, it being understood that the type-carriers 20 have the limited printing-movement which is characteristic of printing quietly by pressure. Springs 149 press the bolster rearwardly, and fore-and-aft adjustment of the bolster 47 may be effected by the setting of a cam 125, shown and fully described in my original application of December 2, 1933, Serial No. 700,646.

The dog-rocker 66 formed as seen in Figure 3 may be pivoted between ears 69, Figure 2, of the bracket 68. The dog-rocker 66 has a spring-pressed pivoted holding dog 70 normally in engagement with the escapement-wheel 67, and retractible therefrom to release the carriage for tabulating. The dog-rocker 66 has also a spring-pressed pivoted stepping dog 71. The described escapement-devices are, in respect to the design of the individual parts and the relative dispositions of said parts, substantially along the lines of the patent to Going 1,682,330.

From the middle portion of the top of the bolster 47 there extends rearwardly and upwardly a transverse wall 91 joined to rearwardly-turned side-walls 92 to form a channel 93. The upper part of the transverse wall 91 has a recess 94 to admit a forwardly-reaching tongue, which forms a counter-stop 95, co-operative with margin-stops 96 of the carriage 40. Said tongue or stop 95 is bent forwardly from an arm 97, which is seen edgewise, and is only shown in such part in Figure 2 as to indicate its improved form. The operation of said arm 97 for margin-releasing and key-locking may be effected by means of parts, not shown, but which may be along the lines used in prior machines and described in Patent 1,255,571, to Anderson, dated February 5, 1918.

In order to clear a tabulating-stop rack 98, which is newly disposed on the carriage 40 for the purpose of cooperating with novel tabulating mechanism housed in part within said channel 93, the transverse wall 91 and related side-walls 92, forming said channel, rise in front of said rack 98, and are then offset rearwardly above the rack, as seen in Figure 2, to reach the counter-stop 95. The counterstop-arm 97 is therefore bent, as shown, to hug the wall 91 to also pass in front of the stop-rack 98. The stop-rack 98 is supported between side-plates 99 of the carriage 40, and mounts a series of key-settable tabulating stops 100 which may be arranged on said rack as set forth in my Patent 1,901,162, dated March 14, 1933. The side-walls 92 extend under the stop-rack 98 and have flanges 101 to which is attached, by screws 102, a column-like housing 103 which supports parts of said novel tabulating mechanism.

The tabulating mechanism includes a row of denominational keys 160 on upright stems 161 at the front ends of key-levers 162, operable to selectively bring upstanding denominational stop-blades 163 into co-operation with the rear ends of the key-set stops 100 of the carriage. The key-levers 162 converge rearwardly, so that their rear ends 164 underlie the lower ends 165 of said blades 163, said rear lever-ends 164 and lower blade-ends 165 being kept in alignment by being guided in slots 166 of the aforesaid housing 103, in which said blades 163 are mounted. The key-levers 162 swing about a fulcrum-rod 168 mounted on arms 158 of the framework.

In order that the lifting of any denominational blade may be translated into forward displacement of its upper front edge 167 into the path of a key-set stop 100, and in order that the blade-portions forming said edges 167 may be firmly supported at the carriage-impact, and, further, in order that the carriage-arresting portions of the blades may have the comparatively close letter or denominational spacing, the following construction may be provided.

Near its lower end each blade has a slot 169 whose sides slidably fit a transverse rod 170 fixed in the housing 103. By having the slots 169 inclined, as shown, the lifting of any blade 163 forces its lower end forwardly in consonance with the desired forward displacement of the carriage-arresting edge 167 at the top of the blade which is guided as follows.

The housing 103 has a cap-plate 171 having slots 172 denominationally spaced. The seats of said cap-plate slots 172 and top edges 173 of the blades are preferably straight and are inclined as shown, so that when a blade is lifted, it is also forced forwardly by the seat of its cap-plate slot 172, to bring its carriage-arresting edge 167 into the path of the carriage-stop 100. Spaced from the top-plate 171 is an additional blade-guide 174 fastened to the housing 103 by screws 175 and having slots 176, the bottoms of which co-operate with edges 177 of the blades to keep the top edges 173 within the cap-plate slots 172, when the blades 163 are dropped upon release of the key-levers 162. The cap-plate 171 and the additional guide 174 are relatively disposed as shown, and are respectively above and below the carriage-stops 100, whereby the sides of the slots 172 and 176 are best enabled to support the blades against the carriage-impact during tabulating. Said carriage-arresting-blade edges 167 are inclined in the direction of the case-shift to be operative in the upper-case as well as in the lower-case position of the carriage 40.

In addition to, and similar to, the denominational blades 163, there is an upstanding blade 178, also having at its lower end an inclined slot 169 and guided at its upper end by an additional slot 172 in the cap-plate 171 and by an additional slot 176 in the lower guide 174. Said additional blade is operative by a key-lever 179 similar to the tabulating-key levers 162 and having a key 180, said additional blade 178 and key-lever 179 being operative to restore any of the key-set tabulating stops 100 on the carriage when the stop to be restored has been tabulated to the denominational blade of lowest denomination, the additional blade 178 therefore adjoining said lowest denominational blade 163, as indicated in Figure 3.

A novel train for setting the carriage-stops 100 individually includes a key-lever 181, similar to the tabulating-key levers 162. Operation of said stop-setting key-lever 181 lifts a blade 182 guided at its lower end in the housing 103 and by the rod 170 similarly to the other blades 163, 178. Instead of reaching upwardly to the same extent as said other blades, the blade 182 has a forwardly-extending arm 183 articulated by means of a pin 184 to the end of an arm 185 forming part of a yoke 186 which may be formed as indicated in Figure 3, and is rotatable upon a cross-shaft 187, journaled in the blade-housing 103. Said yoke 186 also has an arm 188 which presents a finger 189 opposite the stop-restoring edge of the blade 178, said restoring edge being at the rear side of the stops 100, and the stop-setting finger 189 being at the front of said stops 100 as shown in Figure 5. It will be seen now that operation of the key-lever 181 swings the finger 189 to set any stop 100 that, by positioning the carriage, has been brought opposite said finger.

Besides being rotatable upon the shaft 187, the yoke 186 is also movable lengthwise of said shaft for the purpose of avoiding jamming of its finger 189 should the carriage be released when said finger, while engaged in setting one of the stops 100 rearwardly, is still between two adjacent ones of said stops 100. For this purpose, the yoke 186 is yieldably held, by a spring 190, in its normal position against the side of the housing 103. The pin 184 is freely articulated to the arm 183 of the stop-setting-blade 182, in order to permit the described endwise movement of said yoke. An important object attained by the described means for stop-setting is to cause the finger 189, while setting a stop 100, to move squarely toward the latter, so as to avoid the liability of striking adjacent stops, and at the same time to provide for the described jam-avoiding lateral movement of said finger.

The shaft 187 has fastened thereto a universal bar 191 operable by any one of the denominational blades 163, for the purpose of releasing the carriage from the escapement-wheel 67. The universal bar 191 has an arm 192, which, in effect, forms an arm of said shaft 187. Each denominational blade 163 has a forwardly-reaching finger 193 to engage the universal bar 191. The carriage-releasing arm 192 of the universal bar 191 is connected by a link 194 which ranges downwardly and forwardly for articulation with a slot 195 of a dog-releasing lever 196, pivoted to the bracket 68 which mounts the dog-rocker 66. At its lower end portion, the link 194 is guided in proper direction by passing between the rod 170 and another rod 198 which supports an anchor-piece 199, to which are attached springs 200 which serve to restore the blades 163, 178 and 182. The upper end of the stop-setting blade 182 may be retained against lateral displacement by playing in a slot 201 afforded by the universal bar 191. A spring 197 applied to the dog-releasing lever 196 urges the latter and the rest of the universal-bar train to normal, Figure 2 position.

The stop-restoring blade may also have a cam 203 which is operative to restore all the set stops 100 by a run of the carriage when said stop-restoring blade 178 is maintained in forwardly-projected position by its key-lever 179.

Figure 4 is a diagram representing modification of the tabulating mechanism when the latter is to be used only for column-tabulating. In this case only one stop-blade, 159, is employed, and this one blade is in the position occupied by the lowest denomination-blade of the denominational set, in order to be properly co-operative with the stop-restoring blade 178, it being understood that, when a stop 100 is to be restored, the carriage is tabulated to said column-stop blade 159. The column-tabulating key may be in the form of a bar 204, disposed as shown at Figure 4, between the stop-clearing and stop-setting keys 180, 202. Said tabulating-key bar 204 may be mounted upon key-levers 205 which may be yoked together, as indicated in Figure 4, by a fulcrum-sleeve 206, a rivet 207 and a rod 208.

The typing key-levers 73 normally abut a cushion-stop 209 mounted on a comb-plate 210 formed and mounted as shown in Figure 2 to guide the stems 161 of the tabulating key-levers. Said stems 161 may have stroke-limiting ears 211 striking a cushion-stop 212. Normally the tabulating key-levers seat against another cushion-stop 213, the stops 212, 213 being mounted on a plate 214 secured with a comb-plate 215 for the typing key-levers 73 to a cross-bar 216.

The improvements afford simplicity and the mechanism is efficient in operation. It will be noted that with the exception of the tabulating-key levers 162 and the carriage-stops 100, the improved tabulating mechanism, including the stop-setting and stop-clearing devices, and the described liftable, and at the same time forwardly movable, blades, may be assembled as a unit, all mounted in the housing 103, and easily placeable upon, or removable from, the machine.

In Figure 2 it may be seen that the tabulator-mechanism housing is adjustable fore and aft as a unit and with the bolster 47, and with the carriage 40, and exact relative positions are maintained between the tabulating stops and counter-stop for any adjustment. At said Figure 2 it also can be seen that the denominational keys 162 are fulcrumed upon the main frame structure 15, 158, and that the upper faces of the rear ends of said levers are arranged parallel to the adjustment of the bolster unit 47, 103.

Variations may be resorted to within the scope of the invention, and portions of the improvements may be used without others.

Having thus described my invention, I claim:

1. A tabulating mechanism for a typewriter-carriage including a plurality of upstanding blades for engaging, by transverse edgewise movement thereof, a stop on said carriage, key-levers for selectively lifting said upstanding blades, and means mounting said blades side by side and acting as blade-guides, said means including a guide extending transversely of the blades and having slots in which one set of edges at the upper ends of said blades are received, said means also including a second transverse guide disposed lower than the first guide and having slots in which a second set of edges of said blades are received, said guide-slots and the blade-edges received therein being inclined, as viewed sidewise of the blades, and the blade-portions between said guides being the portions which engage said carriage-stop, whereby, when a blade is lifted, its stop engaging portion is forced into the path of said carriage-stop and is forced out of said path when said blade is dropped.

2. A tabulating mechanism for a typewriter-carriage including a plurality of upstanding blades for engaging, by transverse edgewise movement thereof, a stop on said carriage, key-levers for selectively lifting said upstanding blades, and means mounting said blades side by side and acting as blade-guides, said means including a guide extending transversely of the blades and having slots in which one set of edges at the upper ends of said blades are received, said means also including a second transverse guide disposed lower than the first guide and having slots in which a second set of edges of said blades are received, said guide-slots and the blade-edges received therein being inclined, as viewed sidewise of the blades, and the blade-portions between said guides being the portions which engage said carriage-stop, whereby, when a blade is lifted, its stop-engaging portion is forced into the path of said carriage-stop and is forced out of said path when said blade is dropped, said lower blade-ends having perforations forming slots whose sides are inclined similarly to said guides, a fixed transverse guide-rod extending through said slots, whereby, when the upper part of said blade is forced transversely edgewise, the lower part is also so forced upon lifting or dropping of the blade.

3. A tabulating mechanism for a typewriter-carriage including a plurality of upstanding blades for engaging a stop on said carriage by transverse movement, key-levers for selectively lifting said blades, and means mounting said blades side by side and guiding each of said blades in parallel movement in an oblique direction, edgewise of the blade, said means being operative upon the upper and lower portions of each blade to guide said blade portions in unison, whereby the stop-engaging edge of the blade being lifted, is advanced in parallel movement into the path of the carriage-stop.

4. A tabulating mechanism for a typewriter-carriage including a plurality of upstanding blades for engaging a stop on said carriage by transverse movement, key-levers for selectively lifting said blades, and means mounting and guiding said blades side by side for parallel movement of each blade in an oblique direction, edgewise of the blade, whereby the stop-engaging edge of the blade being lifted, is advanced in parallel movement into the path of the carriage-stop, and a spring cooperating with said mounting and guiding means to urge the lifted blade out of the path of the carriage-stop upon release of the corresponding key-lever.

5. In a typewriting machine, a tabulating mechanism for a typewriter-carriage, including a plurality of upstanding blades for engaging a stop on said carriage, an actuator movable in an up-and-down direction for lifting one of said blades by abutting the lower end thereof, and means mounting and guiding said blades side by side for parallel movement of each blade in an oblique direction edgewise of the blade, whereby the actuated blade is advanced in parallel movement into the path of the carriage-stop, said blade actuator having sliding engagement with a corresponding blade to facilitate unitary removal of the tabulating mechanism from the typewriter, said mounting and guiding means including a support detachable from the machine.

6. A tabulating mechanism comprising a housing having spaced inclined slots in its top and a slotted cross bar, and a pin extending transversely near the bottom; and a plurality of blades spaced in said housing by their tops extending in the inclined slots of the housing top and other portions extending in the slots of the cross bar, the blades being slotted to receive the transversely extending pin and translate, in cooperation with the housing slots, an upward thrust on any blade into an upward and forward movement thereof.

WILLIAM F. HELMOND.